United States Patent
Highfill

(10) Patent No.: US 6,590,834 B1
(45) Date of Patent: Jul. 8, 2003

(54) LOCAL POSITIONING SYSTEM USING ACOUSTIC TIME-OF-FLIGHT AND A FIXED ARRAY OF RECEIVERS AND METHOD FOR USE

(76) Inventor: Robert R. Highfill, 114 Norway La., Oak Ridge, TN (US) 37830

( * ) Notice: Subject to any disclaimer, the term of this patent is extended or adjusted under 35 U.S.C. 154(b) by 0 days.

(21) Appl. No.: 09/382,383

(22) Filed: Aug. 24, 1999

Related U.S. Application Data

(60) Provisional application No. 60/093,999, filed on Jul. 24, 1998.

(51) Int. Cl.$^7$ ................................................. G01S 3/80
(52) U.S. Cl. ....................................................... 367/128
(58) Field of Search ................................. 367/128, 902

(56) References Cited

U.S. PATENT DOCUMENTS

| | | | |
|---|---|---|---|
| 4,136,394 A | * 1/1979 | Jones et al. | 367/902 |
| 4,885,725 A | 12/1989 | McCarthy | 367/129 |
| 4,924,450 A | 5/1990 | Brashear et al. | 367/118 |
| 4,939,701 A | * 7/1990 | Brunner et al. | 367/128 |
| 5,062,087 A | * 10/1991 | Dydzyk | 367/910 |
| 5,280,457 A | 1/1994 | Figueroa et al. | 367/127 |
| 5,492,014 A | 2/1996 | Hazony | 73/644 |
| 5,493,912 A | 2/1996 | Günther et al. | 73/644 |

OTHER PUBLICATIONS

Webster's Ninth New Collegiate Dictionary, 1983, p. 971.*

* cited by examiner

Primary Examiner—Daniel T. Pihulic
(74) Attorney, Agent, or Firm—Pitts & Brittian, P.C.

(57) ABSTRACT

A local positioning system (LPS) using acoustic time-of-flight and a fixed array of receivers. The LPS provides an automatic means of determining the position of a roving transmitter with respect to that of a fixed reference station based on the known relative positioning of the receivers and the times-of-flight of the pulsed signal to each receiver. The location means is local in nature and independent of any remote transmissions such as those from remote radio antennae or satellites. The LPS employs pulsed acoustic emissions and does not require a clear line of sight between the rover and the receiver. To provide a more accurate calculation of the location of the rover, the position data is adjusted for the current speed of sound and the wind velocity.

16 Claims, 6 Drawing Sheets

LOCAL POSITIONING SYSTEM USING ACOUSTIC TIME-OF-FLIGHT AND A FIXED ARRAY OF RECEIVERS AND METHOD FOR USE

CROSS-REFERENCE TO RELATED APPLICATIONS

This Application claims the benefit of U.S. Provisional Application No. 60/093,999, filed Jul. 24, 1998.

STATEMENT REGARDING FEDERALLY SPONSORED RESEARCH OR DEVELOPMENT

Not Applicable

BACKGROUND OF THE INVENTION

1. Field of Invention

This invention relates to the field of systems for position measurements. Specifically, this invention relates to systems for monitoring the position of a survey unit with respect to a base station using local acoustic time-of-flight measurements.

2. Description of the Related Art

It is known in the art to use magnetic and radiometric environmental surveys to search property for unexploded ordinance and radiation contamination. Such surveys are improved by collecting high resolution, position-correlated survey data which fully document the survey results and permit computer modeling and analysis to identify minimal targets and characteristics. A basic environmental survey is conducted by surveying the area using an appropriate survey instrument and placing a marker where the audible output from the instrument directs. Documentation of such a survey typically consists only of field notes and hand drawings. Such a survey leaves considerable uncertainty as to the reliability of the survey results.

One method for improving the accuracy of position data obtained from a walk-over environmental survey is differential global position system (DGPS) tracking using orbital satellites. DGPS is a convenient method for conducting a survey in open areas; however, it is inaccurate in wooded areas or areas containing structures due to the attenuation and the reflection, or multipathing, of the satellite signals. Further, obtaining the high resolution and accuracy necessary to locate small targets using DGPS is expensive.

Other technologies have been developed to improve the accuracy of walk-over environmental surveys. One such improvement automatically tracks the surveyor and simultaneously records the sensor output in a digital memory. The data is used to provide track maps which document precisely the manner in which the surveyor covers the area. This data is also used to generate color-coded maps showing, in detail, the sensor output over the surveyed area.

Finally, laser tracking has been evaluated, but it is difficult to use in wooded environments where the line of sight is obstructed. When the surveyor's signal is lost due to tree shadowing, the tracker must reacquire the surveyor's location before the survey data can be matched. Reacquisition times of several seconds are not uncommon in such environments, thereby greatly slowing the survey and/or reducing the accuracy.

Other devices for ranging determination have been developed. Typical of the art are those devices disclosed in U.S. Pat. No. 4,924,450 issued to Brashear et al., on May 8, 1990. Brashear et al., teaches the use of setting up multiple ultrasonic receivers at fixed locations around the property being surveyed and carrying a backpack containing an ultrasonic transmitter and a radio frequency transmitter. The ultrasonic signal is used to calculate time of flight data from the position of the backpack to each of the ultrasonic receivers. The radio frequency signal carries data from the survey instrument to a computer which is located nearby. Upon receipt of the ultrasonic signal, each ultrasonic receiver announces the arrival time to the computer using a radio frequency signal. The arrival time data is used to calculate the location of the backpack using time-of-flight triangulation.

The invention of Brashear et al., requires that the ultrasonic receivers be located in fixed positions around the property to be surveyed. These positions must be taught to the computer so that the computer can triangulate a position using a value received from a particular ultrasonic sensor. In order for the invention of Brashear et al., to operate properly the distances between multiple ultrasonic receivers must be carefully measured. This makes it unnecessarily difficult to transport and setup the positioning system for use in multiple locations due to the use of multiple receiver units and the precise placement required for proper operation. Finally, the invention of Brashear et al., does not consider the environmental effects of temperature and wind speed on the instantaneous speed of sound for a given measurement. In addition, the commercial version of the Brashear et al. invention is expensive, with the price of the complete system approaching $100,000. Further, it is a complex system requiring a team of experienced operators for use in field operations.

Similarly, U.S. Pat. No. 5,280,547 issued to Figueroa et al., on Jan. 18, 1994 discloses a position detecting system and method. Figueroa et al., teaches the use of a plurality of ultrasonic receivers located at known, fixed locations. In order to eliminate the speed of sound as a variable from distance measurements, a complex mathematical matrix is used to estimate the speed of sound for every ranging operation. Like the system of Brashear et al., the invention of Figueroa et al., requires the calibration of the system to determine the exact location of the receivers. This is accomplished by moving the receiver to a known position and measuring the time-of-flight to each receiver. However, Figueroa et al., does not teach a method for removing the effects of wind from the calculations.

Accordingly, there is a need for system which can be used for environmental surveys and which automatically tracks the surveyor using a local positioning system employing ultrasonic time-of-flight technology and which does not disturb the surveyor or the animals in the area. The system would have high resolution and accuracy, be inexpensive, be lightweight and easily portable, and be suitable for use in most terrains including wooded areas and inside buildings. Further, there is a need for a system which does not require a complex installation and calibration procedure. Such a system would have a single reference station which must be placed to provide a reference point from which to calculate the location of the roving transmitter. Finally, the system would automatically record the current speed of sound and wind effects at each location.

Therefore, it is an object of the present invention to provide a local-positioning environmental survey system employing ultrasonic time-of-flight technology.

Another object of the present invention is to provide a local-positioning environmental survey system in which the ultrasonic pulse does not disturb the surveyor or the animals in the area.

It is another object of the present invention to provide a local-positioning environmental survey system having high resolution and accuracy.

It is a still further object of the present invention to provide a local-positioning environmental survey system suitable for use in most terrains including wooded areas and inside buildings.

Yet another object of the present invention to provide a local-positioning environmental survey system which is cost effective.

Yet still another object of the present invention is to provide a local-positioning environmental survey system which is lightweight and easily portable.

BRIEF SUMMARY OF THE INVENTION

A local positioning system (LPS) using acoustic time-of-flight and a fixed array of receivers provides an automatic means of determining the position of a roving transmitter, or rover, with respect to that of a fixed reference station. The LPS uses local, pulsed, ultrasonic emissions without the need for a clear line of sight between the rover and the reference station. To provide a more accurate calculation of the location of the rover, the position data is adjusted for the current speed of sound and the wind velocity.

The reference station is a stationary device having a plurality of equidistant receiver pods mounted on the distal end of elongated members radiating outwardly from a control module in an orthogonal array. The receiver pods are designed to receive information transmitted from the roving transmitter. A leveling system is included to level the horizontal receiver pods. To ensure clear reception of the ultrasonic transmissions, it is desired that the rover be aimed at the reference station. The optional transmitter pod configured to broadcast the ultrasonic signal in a circular pattern can be connected to the rover eliminating the need to aim the rover.

The roving transmitter is designed to be small, lightweight, and easily portable, either worn or carried by the user. The rover emits a short ultrasonic pulse, lasting only a few cycles, in a near circular wavefront pattern. The time of the emission of the ultrasonic pulse is announced to the reference station using a low power radio frequency signal.

Various connectors are included to allow the rover to communicate with external devices. For example, some survey instruments contain sufficient memory to allow the LPS data to be stored along with the data acquired by the survey instrument. In other cases, it is preferable to channel the data acquired by the survey instrument through the rover and output the survey instrument data, along with the LPS data, to a portable memory device. Once transferred, the LPS data can be translated into coordinates using a simple post-processing program.

To calculate the position of the rover in relation to the reference station, a short ultrasonic pulse is emitted from the rover ultrasonic transmitter. Simultaneously, the rover RF transceiver transmits a low power RF signal pulse. When the RF signal pulse is received by the reference station RF transceiver, the reference station starts a clock for each receiver pod. As the leading edge of the ultrasonic pulse is received at each receiver pod, the associated clock is stopped. The processing device records the measured time-of-flight from each of the receiver pods.

To measure the speed of sound for the current atmospheric conditions, an ultrasonic pulse is emitted from a transmitter centrally mounted on the reference station, equidistant from each receiver pod. The speed of sound is calculated by averaging the time-of-flight of this ultrasonic pulse to each pair of diametrically opposed receiver pods and dividing into the distance from the reference station ultrasonic transmitter to the receiver pods. By averaging time of flight value to two diametrically opposed receiver pods, the effect of wind along that axis can be removed. The reference station transmits the measured times to the rover via the RF transmitter.

The accuracy of the measurements is improved by incorporating an orthogonal array of four receiver pods thereby making it always possible to choose three pairs of receiver pods where the angle between the location of the rover and the normal bisector to the line joining each receiver pod pair is less than 45 degrees. To further reduce the sensitivity of the LPS to time-of-flight measurement errors and improve the accuracy of the LPS, the data obtained from the three preferred receiver pod pairs are averaged.

BRIEF DESCRIPTION OF THE SEVERAL VIEWS OF THE DRAWINGS

The above-mentioned features of the invention will become more clearly understood from the following detailed description of the invention read together with the drawings in which.

DETAILED DESCRIPTION OF THE INVENTION

A local positioning system using acoustic time-of-flight and a fixed array of receivers or, local positioning system (LPS), is illustrated generally as 10 in the Figures. The LPS 10 provides an automatic means of determining the position of a roving transmitter, or rover, with respect to that of a fixed reference station. The LPS 10 operates independently of any remote transmissions such as those from remote radio antennae or satellites. The LPS 10 employs local, pulsed, ultrasonic emissions and does not require a clear line of sight between the rover and the reference station. To provide a more accurate calculation of the location of the rover, the position data is adjusted for the current speed of sound and the wind velocity.

Figure 1:
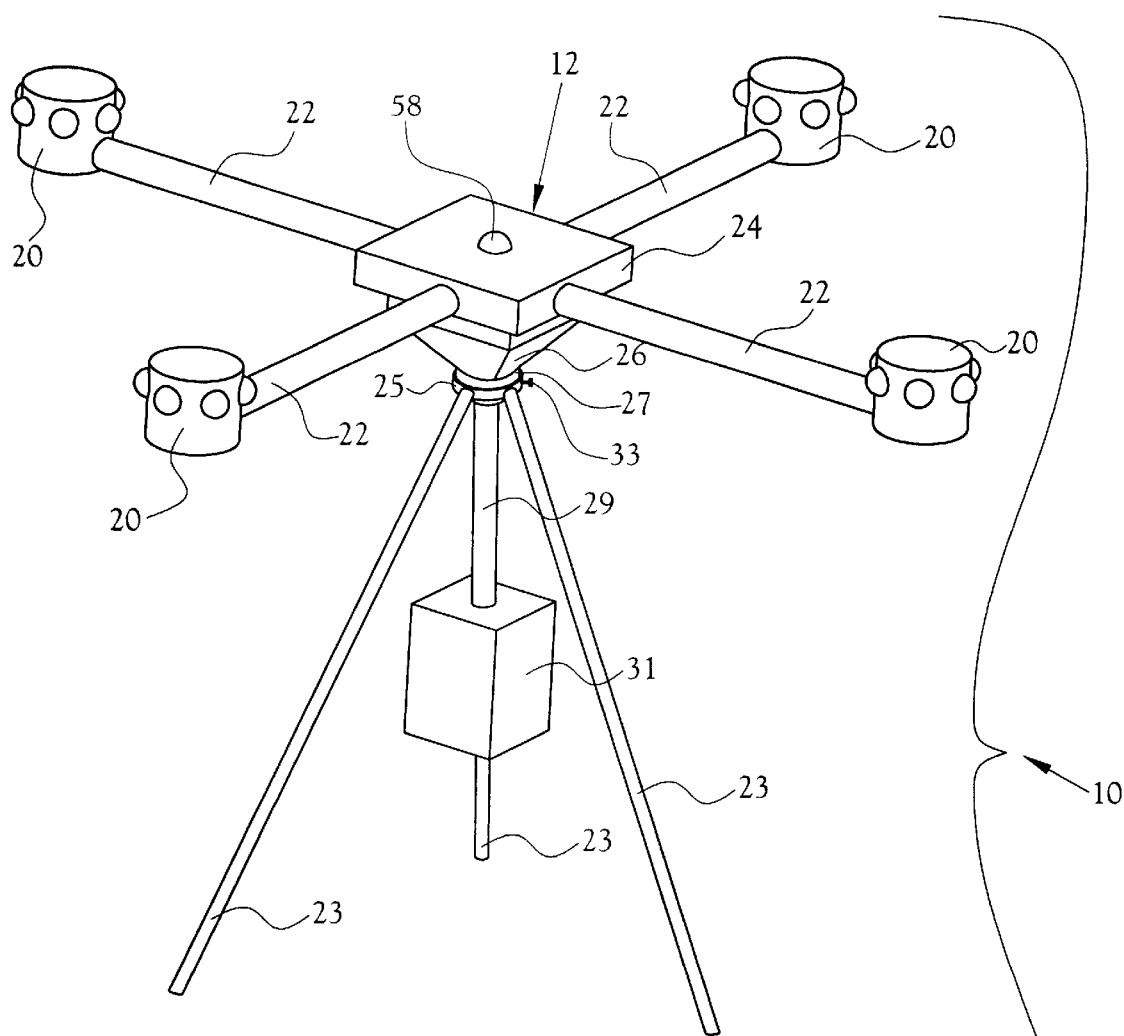
FIG. 1 is a perspective view of a local positioning system of the present invention using acoustic time-of-flight and a fixed array of receivers to measure position in two dimensions.
Figure 1:
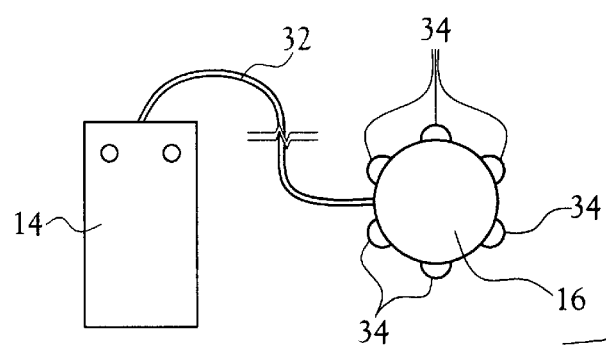

FIG. 1 illustrates a perspective view of the LPS 10 configured to measure coordinates in two-dimensions. The LPS 10 includes a reference station 12, a roving transmitter 14, and an optional transmitter pod 16. The reference station 12 is a stationary device supported by at least one elongated leg members 23 extending from the base 26 of a control module 24. In the illustrated embodiment, the elongated leg members 23 form a collapsible tripod to allow for easy transportability and set-up; however, one skilled in the art will recognize that other structural members can be used without interfering with the objects and advantages of the present invention.

A plurality of receiver pods 20 are mounted at the distal end of elongated arm members 22 extending radially outward from the control module 24 in the horizontal plane. The receiver pods 20 are designed to receive information transmitted from the roving transmitter 14. The ultrasonic signals used for communication require that the roving transmitter 14 be aimed at the reference station 12 to ensure clear reception. The optional transmitter pod 16, connected to the rover 14 via cable 32, provides improved transmission capabilities through a plurality of transmitters 34.

It is desirable for the receiver pods 20 to remain level in a single plane to ensure accurate measurements. However, in remote outdoor locations, a level surface on which to place the reference station 12 is not always available. One skilled in the art will recognize that a number of leveling systems could be implemented. In the illustrated embodiment, a ball-and-socket joint to automatically levels the reference station 12. The ball-and-socket joint includes a retaining ring 25 which receives a spherical knob 27 disposed on the bottom surface of the reference station 12. Extending from the spherical knob 27 is an elongated member 29 having a counterbalancing weight 31 disposed at the distal end. In the preferred embodiment, the batteries used to power the reference station also serve as the weight 31. A locking mechanism 33, such as a set screw, is included to secure the spherical knob 27 in a fixed position once the reference station 12 has been leveled.

Figure 1A:
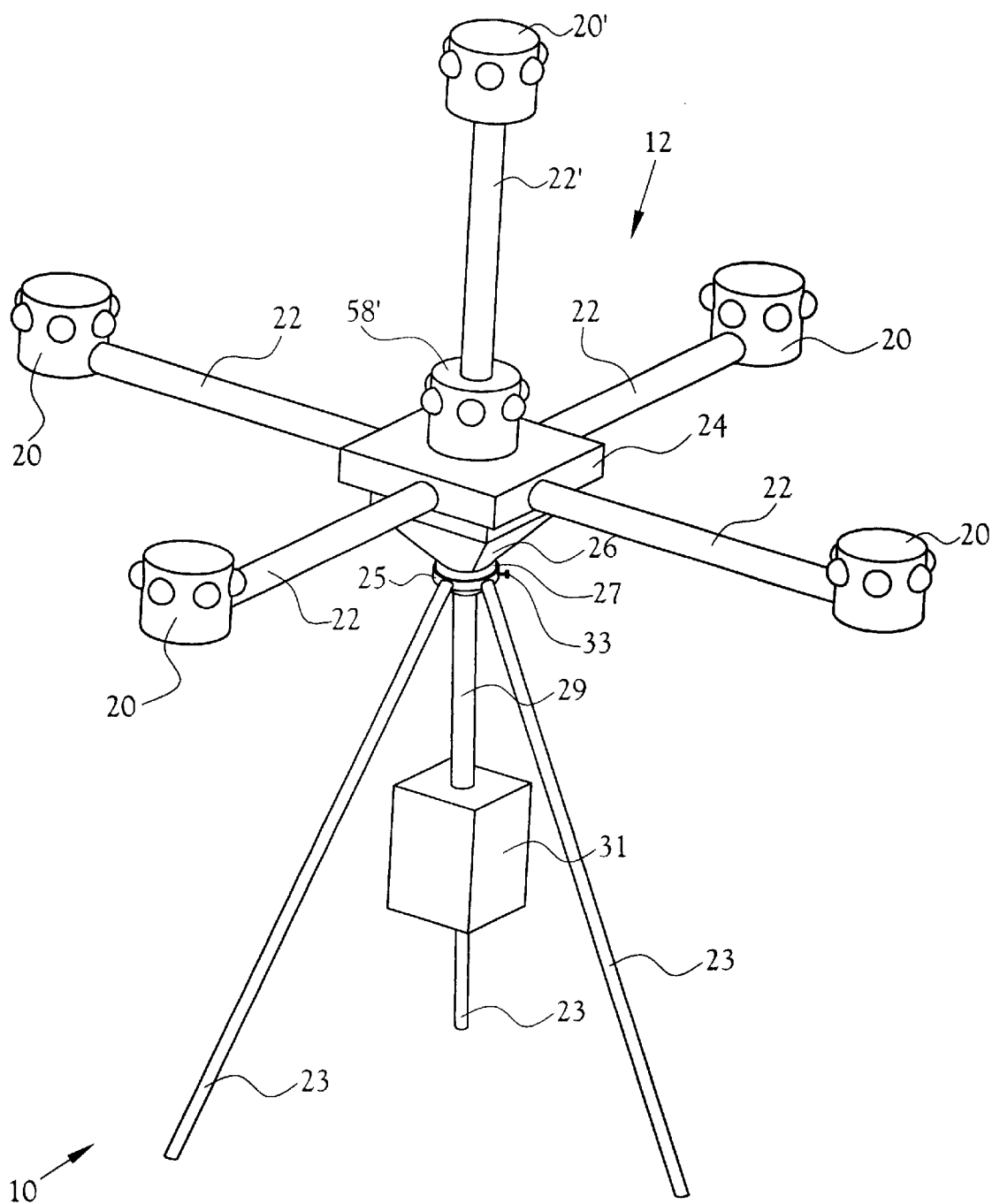
FIG. 1a is a perspective view of an alternate embodiment of the local position system of FIG. 1 using acoustic time-of-flight and a fixed array of receivers to measure position in three dimensions.

By adding a fifth receiver pod 20' on a vertical arm 22', as in illustrated in FIG. 1a, an alternate embodiment of the reference station 12' is provided having the capability to measure coordinates in three dimensions. The three-dimensional reference station 12' further includes an ultrasonic transmitter pod 58' at the base of the vertical arm 22'. In the specification, the two-dimensional reference station 12 will be discussed; however, one skilled in the art will recognize that the discussion is applicable to the three-dimensional reference station 12' as well. Again, leveling is required to ensure accurate position data with respect to the vertical component.

Figure 2:
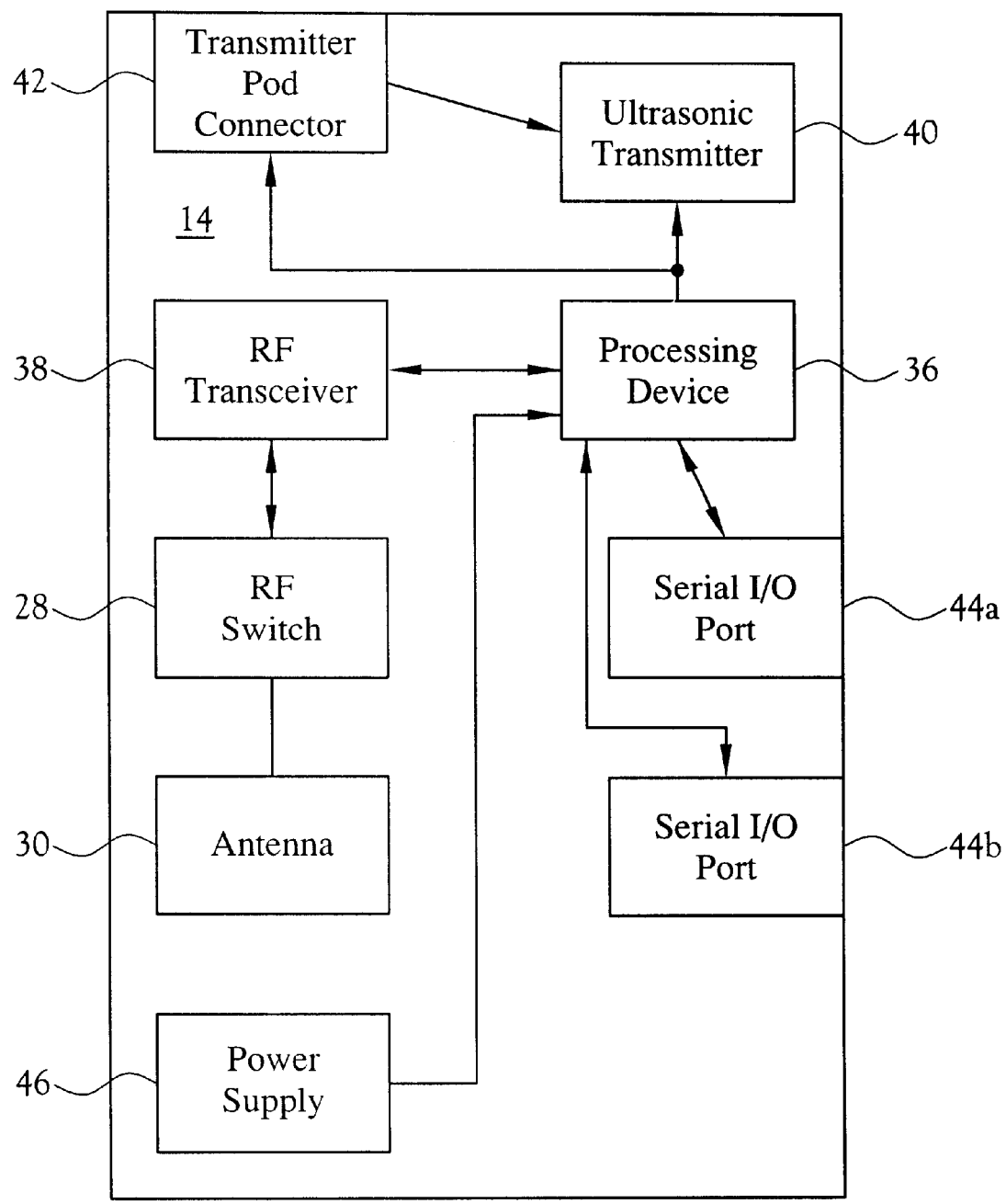
FIG. 2 is a block diagram of a roving transmitter of the present invention.

FIG. 2 illustrates a block diagram of the roving transmitter 14. The rover 14 is designed to be small, lightweight, and easily portable, either worn or carried by the user. The roving transmitter 14 includes a processing device 36, a radio frequency (RF) transceiver 38, an ultrasonic transmitter 40, a transmitter pod connector 42, at least one serial communication port 44, and a power supply 46, such as a 9 v alkaline battery. The rover 14 emits a short ultrasonic pulse, lasting only a few cycles, in a near circular wavefront pattern. In one embodiment, the rover 14 automatically emits the ultrasonic pulse at a predetermined time interval. Alternatively, the ultrasonic pulse is emitted only upon a specific command from the rover operator. The time of the emission of the ultrasonic pulse is announced to the reference station using a low power radio frequency signal.

The selection of the ultrasonic and RF transmitters and receivers is critical to the successful development of the system. In the preferred embodiment, the RF transceiver 38 is a single chip including both a RF transmitter and a RF receiver. One skilled in the art will recognize that separate transmitter and receiver chips can be used without interfering with the objects of the present invention. The single chip transceiver 38 is selected for its easy design integration and low cost. Further, the single chip RF transceiver 38 requires no external components other than an antenna 30 and a RF switch 28 so that the antenna 30 can be used for both transmission and reception. The preferred antenna 30 is a standard quarter wavelength, whip antenna. Such an antenna provides a communication range of over 300 feet, which is sufficient for the requirements of the present invention. The ultrasonic transmitter 40 of the preferred embodiment is an industrial grade, 16 mm diameter, piezoelectric transmitter having a resonant frequency of 25 kHz. The preferred ultrasonic transmitter 40 is selected for its narrow bandwidth, small size, ruggedness and low cost.

Various connectors are included to allow the rover 14 to communicate with external devices. Previously noted is the transmitter pod connector 42 for connecting the external transmitter pod 16 which broadcasts the ultrasonic signal in a circular patten. Plugging the transmitter pod 16 into the transmitter pod connector 42 disables the internal ultrasonic transmitter 40 of the rover 14.

The rover 14 includes at least one serial communication port 44 to transfer data to an external storage or analysis system (not shown). In the illustrated embodiment, the rover 14 includes a first serial communication port 44a operating at 9600 baud for transferring ASCII data and a second serial communication port 44b for interfacing to a survey instrument (not shown) being used by the operator. Several interfacing strategies are possible depending on the type and output of the survey instrument and the preference of the operator. For example, some survey instruments contain sufficient memory to allow the LPS data to be stored along with the data acquired by the survey instrument, as with the Geometrics G-858 Portable Cesium Magnetometer/Gradiometer. In other cases, it is preferable to channel the data acquired by the survey instrument (not shown) through the rover 14 and output the survey instrument data, along with the LPS data, to a portable memory device (not shown), such as a palmtop computer. Once transferred, the LPS data can be translated into coordinates using an on-line or post-processing program.

Figure 3:
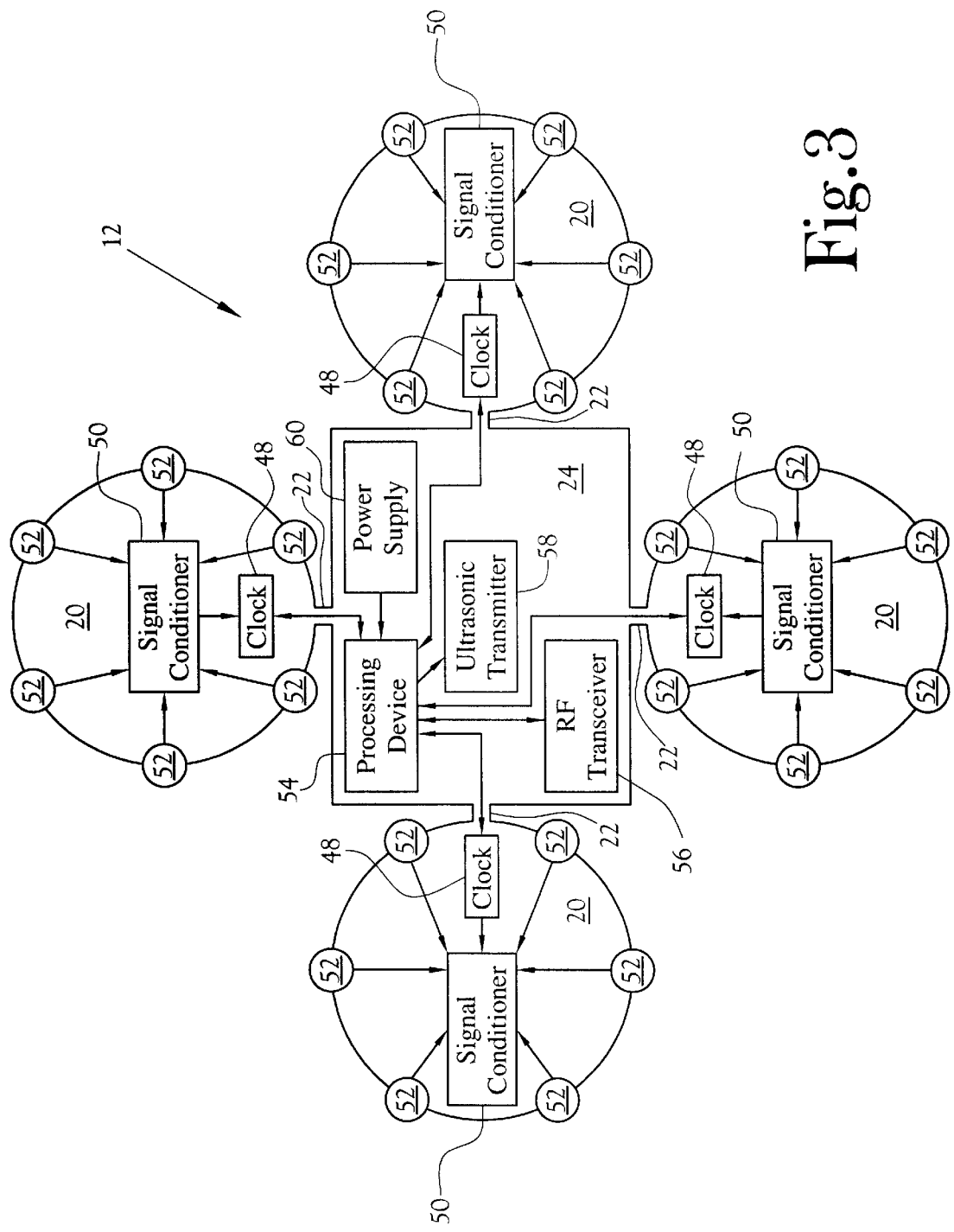
FIG. 3 is a block diagram of the two-dimensional reference station of the present invention.

FIG. 3 illustrates a block diagram of the reference station 12 of the present invention. The reference station 12 includes an array of receiver pods 20 at fixed positions. Each receiver pod 20 includes a clock unit 48, a signal conditioning circuit 50, and at least one microphone unit 52. Each microphone unit 52 is configured to detect signals in the ultrasonic range corresponding to the resonant frequency of the rover ultrasonic transmitter 40. In the preferred embodiment, an array of six microphone units 52 is so positioned as to simulate a spherical or planar omnidirectional response. Each microphone unit 52 is in electrical communication with the signal conditioning circuit and the clock. One skilled in the art will recognize that, while not preferred, a single omnidirectional microphone unit 40 may be used.

Each microphone unit 52 communicates with a processing device 46 that detects the arrival time of the acoustic pulse at each receiver pod 20. These arrival times may be announced via a low power radio transmission. The microphone units 52 are piezoelectric receivers matched to the ultrasonic transmitter 40. The sensitivity of each receiver 52 is reduced by 20 dB at ±2 kHz from the resonant frequency, making them highly immune to extraneous environmental noise. A timing resolution of 4 μsec is achieved by the signal conditioning circuit 50 through high gain amplification and the summing of the signals from the receivers 42 in each receiver pod 20.

This corresponds to a distance of approximately 0.1 cm at the typical 10 speed of sound.

The control module 24 includes a processing device 54, a radio frequency (RF) transceiver 56, an ultrasonic transmitter 58, and a power supply 60, such as two external, sealed 12V lead acid batteries mounted on the leg members 23 or, alternately, by two internal 9V alkaline batteries. The processing device 54 is in electrical communication with each clock 48. At the conclusion of each measurement, the processing device 54 reads the value of each clock 48 representing the time-of-flight from the rover 14, activates the reference station ultrasonic transmitter 58, restarts each clock 48, and reads the value of each clock representing the speed of sound and prevailing wind conditions. The reference station 12 then transmits each five-digit number to the rover 14 via the RF transmitter 56. It is required that the LPS 10 be capable of reliably transmitting at least 50 bytes of data from the reference station 12 to the rover 14 each second. To improve the transmission reliability, the data are encoded using the Manchester algorithm, i.e., coded so that the same number of 1's and 0's are transmitted.

To calculate the position of the rover 14 in relation to the reference station 12, a short ultrasonic pulse is emitted from the rover ultrasonic transmitter 40. Simultaneously the rover RF transceiver 38 transmits a low power RF signal pulse. When the RF signal pulse is received by the reference station RF transceiver 56, the reference station starts a clock 48 for each receiver pod 20. As the leading edge of the ultrasonic pulse is received at each receiver pod 20, the associated clock 48 is stopped. Because the leading edge of the ultrasonic pulse is used to stop each clock 48, sound reflected from some other object and traveling a longer distance will not affect the measurement. The processing device 54 then records the measured time-of-flight from each of the receiver pods 20.

The transmission time for the RF signal between the rover 14 and the reference station 12 is insignificant as compared to the transmission time for the ultrasonic signal. Accordingly, the transmission time of the RF signal has no practical affect on the location measurement made using the acoustic time-of-flight technique.

To measure the speed of sound for the current atmospheric conditions, an ultrasonic transmitter 58 is centrally mounted on the reference station 12, equidistant from each receiver pod 20. The reference station ultrasonic transmitter 58 is pulsed approximately 0.5 seconds after the rover ultrasonic transmitter 40 is pulsed. The speed of sound is calculated by averaging the time-of-flight of this ultrasonic pulse to each pair of diametrically opposed receiver pods 20 and dividing into the distance from the reference station ultrasonic transmitter 58 to the receiver pods 20. By averaging the time of flight value to two diametrically opposed receiver pods 20, the effect of wind along that axis can be removed. Using the time-of-flight measurements for the ultrasonic signal from the rover 14 to each of the receiver pods and the time-of-flight measurements for the ultrasonic signal from the control module 24 to each of the receiver pods 20, the location of the of the rover 14 with respect to the reference station 12 is calculated.

Figure 4:
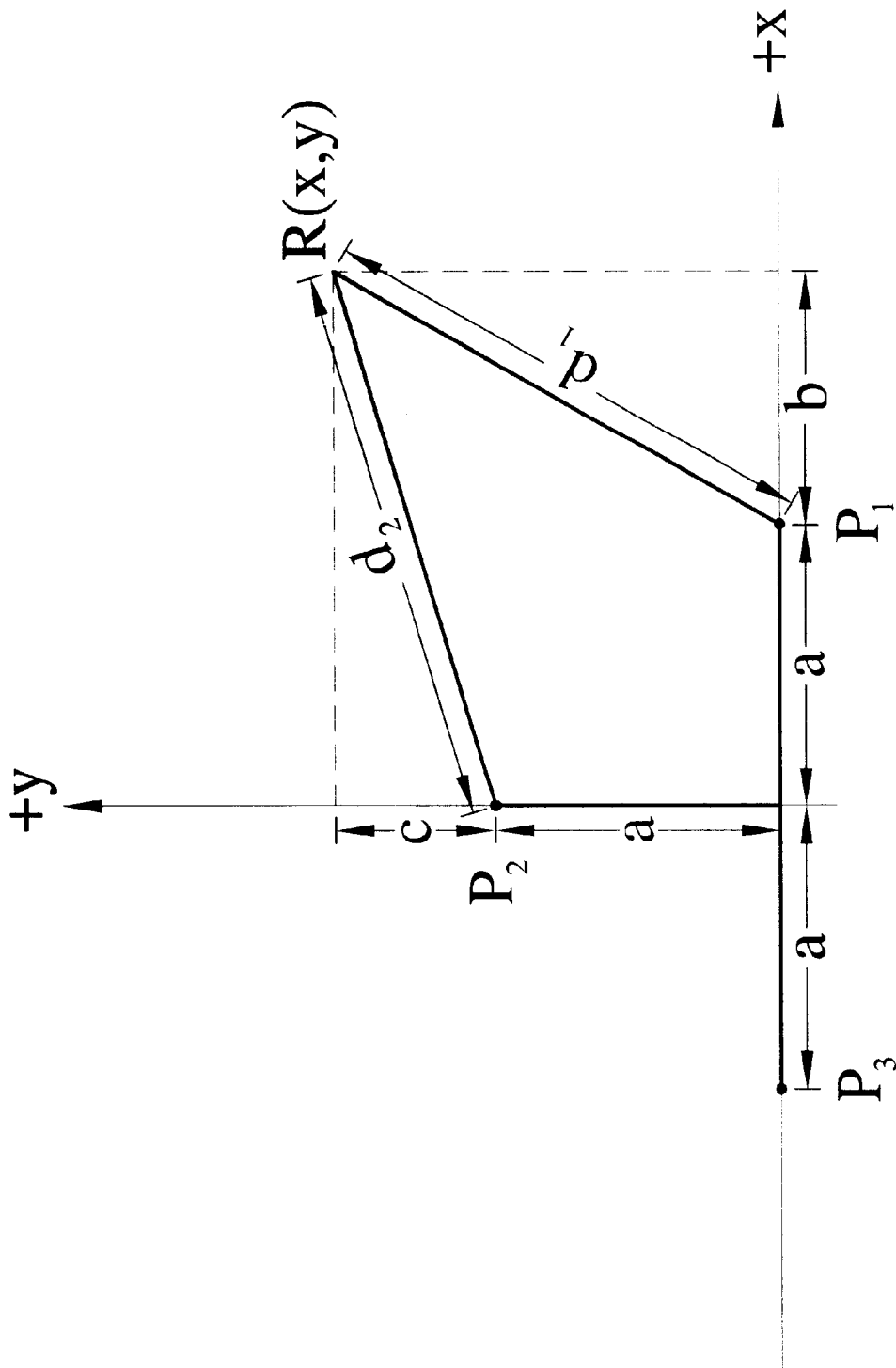
FIG. 4 is a graph of the distance from the reference station to the roving transmitter.

FIG. 4 shows a simplified schematic of one embodiment of the reference station 12 having three receiver pods 20. The rover, R, 14 is located at position (X, Y) with respect to the axes shown. Each receiver pod, $P_1$, $P_2$, and $P_3$, 20 is located at a fixed distance, a, along the +X, +Y, and the −X axes, respectively. Due to the relative proximity of the rover 14 to the receiver pods 20 as illustrated, receiver pods $P_1$ and $P_2$ will detect the ultrasonic pulse prior to receiver pod $P_3$. For the purposes of this illustration, the wind velocity is assumed to be zero.

The additional distances from receiver pods $P_1$ and $P_2$ to the intersection of the perpendiculars from R with the axes defining the distances b and c respectively. The distance from R to each of $P_1$ and $P_2$ is defined as $d_1$ and $d_2$, respectively, and is calculated by multiplying the measured times-of-flight of the ultrasonic pulse to receiver pods $P_1$ and $P_2$, respectively, by the measured speed of sound. Rewriting the position of R as (a+b, a+c), the system of quadratic equations:

$$d_1^2 = b^2 + (a+c)^2 \tag{1}$$

$$d_2^2 = (a+b)^2 + c^2 \tag{2}$$

can be solved for b and c, and resolved into the coordinates (X, Y) indicating the position of R.

To improve the accuracy, the coordinates of R are adjusted to account for the current speed of sound and wind velocity. Wind velocity is calculated using the following equations:

$$w_x = \frac{a}{t_1} - \frac{a}{t_{av}} \tag{3}$$

$$w_y = \frac{a}{t_2} - \frac{a}{t_{av}} \tag{4}$$

where $w_x$ and $w_y$ are the components of the wind velocity along the respective axes, $t_1$ and $t_2$ are the times-of-flight to $P_1$ and $P_2$, respectively, and $t_{av}$ is the average time-of-flight to $P_1$ and $P_2$. For the purposes of this invention, the wind speed is negligible compared to the speed of sound and the distance between the receiver pods is negligible compared to the maximum range of the rover. Accordingly, the values of the coordinates (X, Y) are adjusted for the approximate effects of wind velocity according to the following relationships:

$$x_c \approx x - \frac{w_x(T_1 + T_2)}{2} \tag{5}$$

$$y_c \approx y - \frac{w_y(T_1 + T_2)}{2} \tag{6}$$

where (X, Y) are the wind corrected coordinates, and $T_1$, $T_2$ are the measured times-of-flight from the rover to the receiver pods, $P_1$ and $P_2$, respectively.

In the preferred embodiment, the reference station 12 includes four receiver pods 20 disposed in an orthogonal array and equidistant from the center of the reference station. Such an arrangement was selected to improve the accuracy of the LPS 10 by shallow angle avoidance and position averaging and by providing a mechanism by which to correct the measurements to account for the current wind speed and for variations in the speed of sound.

Figure 5:
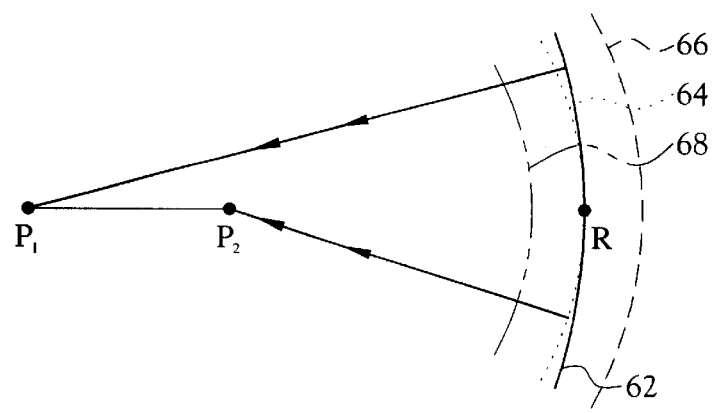
FIG. 5 is an illustration of a measurement error introduced when the roving transmitter is nearly co-linear with a pair of receivers from the fixed array of receivers of present invention.
Figure 6:
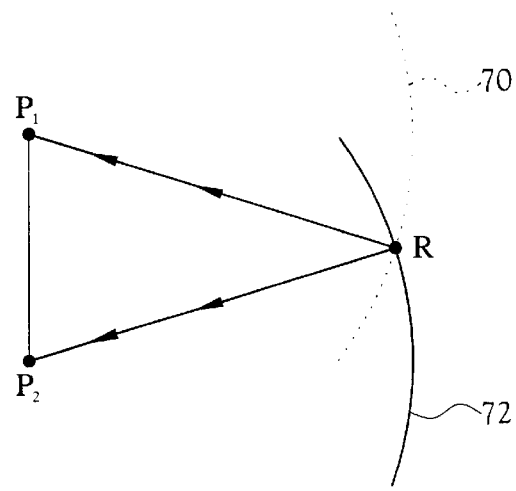
FIG. 6 is an illustration of the optimum measurement position for the roving transmitter with respect to the reference station of the present invention.

FIG. 5 illustrates a phenomenon known as the "shallow angle problem." The shallow angle problem occurs when the rover, R, is nearly co-linear with the receiver pod pair, $P_1$, $P_2$, used to determine the location of the rover, R. For each receiver pod, a distance circle having its origin at the receiver pod and a radius equal to the time-of-flight can be drawn. In FIG. 5, four distance circles are shown. The solid line 62 represents a portion of the circle on which the rover lies with respect to receiver pod $P_1$. The remaining three distance circles represent three differing measurements obtained from receiver pod $P_2$. The broken line 64 represents a portion of the distance circle on which the rover correctly lies with respect to receiver pod $P_2$. The broken lines 66 and 68 represent the distance circles around receiver pod $P_2$ with noise added and subtracted, respectively. In this situation, slight errors in the time-of-flight measurements to each receiver pod 20 cause the distance circles drawn around the receiver pod pair $P_1$, $P_2$ to either not intersect, as in the case with subtracted noise, or to intersect a location quite remote from the correct location, as in the case with added noise. To avoid the shallow angle problem, it is desirable for the location of the rover 14 to be as close as possible to the normal bisector to the line between the receivers. This optimal orientation is illustrated in FIG. 6, in which the broken line 70 represents the distance circle from receiver pod $P^1$ and the solid line 72 represents the distance circle from receiver pod $P_2$.

Figure 7:
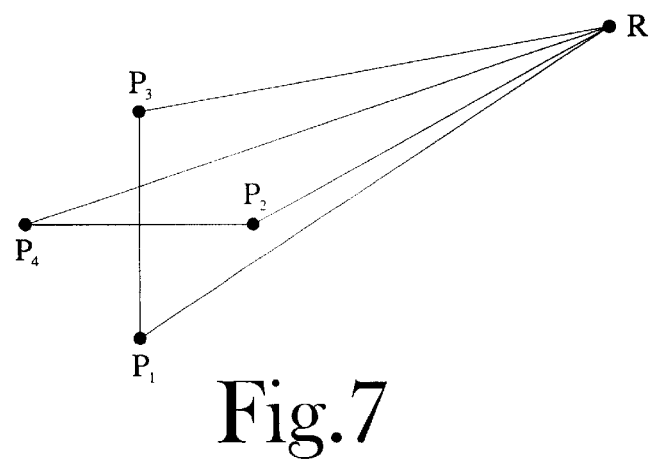
FIG. 7 is an illustration of the selection of the preferred receiver pairs for a particular location of the roving transmitter.

By incorporating an orthogonal array of four receiver pods 20, it is always possible to choose three pairs of receivers pods where the angle between the location of the rover and the normal bisector to the line joining each receiver pod pair is less than 45 degrees, as illustrated in FIG. 7. In the illustration of FIG. 7, the three most useful receiver pod pairs are $P_1$–$P_4$, $P_2$ –$P_3$, and $P_1$–$P_3$. A simple comparison of the time-of-flight values to each of the receiver pods permits the octant in which the rover is located to be determined, and the three preferred receiver pairs are selected accordingly. To further reduce the sensitivity of the LPS 10 to time-of-flight measurement errors and improve the accuracy of the LPS 10, the data obtained from the three preferred receiver pod pairs are averaged.

As previously discussed, the accuracy of the LPS 10 is further enhanced by accounting for the prevailing speed of sound and wind effects for a given measurement. By emitting an ultrasonic pulse from the ultrasonic transmitter 58 located at the center of the reference station 12 and measuring the time it takes to travel the fixed distance to each receiver pod 20, the prevailing speed of sound can be calculated. Accordingly, environmental effects on the speed of sound are accounted for in every measurement automatically. This eliminates the need for a special procedure to periodically measure this parameter as it varies during the day in response to changes in temperature and barometric pressure. This time-of-flight data is also used to calculate transmission time changes along each axis resulting from the prevailing wind conditions at the time of the measurement. While wind effects will vary somewhat between the location of the reference station 12 and the rover 14, the distance is sufficiently short to made such a correction beneficial in a strong breeze.

The stability of the LPS 10 output has been determined by placing the rover 14 at a fixed distance from the reference station 28 and measuring the standard deviation of the variation of the output coordinates from their mean values. At three (3) meters separation, the standard deviation is 0.1 cm, and at 25 meters separation it is 10 cm.

The present inventor measured the useful range of the LPS 10 by moving the rover 14 away from the reference station 12. The system is shown to be sufficiently accurate for field environmental surveys out to a range of approximately 25 m, especially if the survey is conducted in a fixed pattern so that spurious output coordinate values can be easily identified and deleted. This is the half-diagonal for a 35 m×35 m survey area (0.25 acre).

One skilled in the art will recognize that various modifications can be made without interfering with the objects and advantages of the present invention. For example, because only a short output pulse is required, the piezoelectric transducers 40 appear to be capable of transmitting a large amount of power without damage. Accordingly, the power of the ultrasonic output from the ultrasonic transmitter 40 in the rover 14 can be increased so as to extend the range of the LPS 10.

Finally, by integrating various survey instruments, the local positioning system of the present invention linked with an inexpensive color palmtop computer becomes a highly effective field instrumentation package. Such integration enables the surveyor to review a color track map of the survey results at any time during the survey.

In accordance with the present invention, the location of a survey instrument may be automatically tracked while a continuous survey is being made over an area. The local positioning system heretofore described has high resolution and accuracy, and is suitable for use in most terrains, including wooded areas or even inside of buildings. The local positioning system allows for specific discrete locations to be measured in two or three dimensions. The local positioning system is operated manually to determine individual locations, or automatically to continuously track the surveyor at a predetermined rate. The current speed of sound and wind effects are automatically measured at each location. The local positioning system is lightweight and portable. The short 25 kHz ultrasonic pulse used for time of flight measurements does not disturb the surveyor or animals in the survey area.

While a preferred embodiment has been shown and described, it will be understood that it is not intended to limit the disclosure, but rather it is intended to cover all modifications and alternate methods falling within the spirit and the scope of the invention as defined in the appended claims.

I claim:

1. A local positioning system comprising:

a control module housing;

a control module radio frequency transceiver disposed within said control module housing;

a control module processing device disposed within said control module housing, said control module processing device in electrical communication with said control module radio frequency transceiver;

a plurality of timers in electrical communication with said control module processing device;

a plurality of acoustic receivers, each of said plurality of acoustic receivers located equidistant from said control module housing and disposed at a distal end of an elongated member extending radially outward from said control module housing, each of said plurality of acoustic receivers configured to have an onmidirectional response, each of said plurality of acoustic receivers in electrical communication with a selected one of said plurality of timers;

a control module power supply in electrical communication with said control module radio frequency transceiver, said control module processing device, said plurality of timers, and said plurality of acoustic receivers;

a remote unit housing;

a remote unit acoustic transmitter disposed in said remote unit housing;

a remote unit radio frequency transceiver disposed in said remote unit housing;

a remote unit processing device disposed in said remote unit housing, said remote unit processing device in electrical communication with said remote unit radio frequency transceiver and said remote unit acoustic transmitter;

at least one communication port in electrical communication with said processing device; and a remote unit power supply in electrical communication with said remote unit acoustic transmitter, said remote unit radio frequency transceiver, and said remote unit processing device.

2. The local positioning system of claim 1 wherein said control module processing unit starts each of said plurality of timers upon receipt of a radio frequency signal by said control module radio frequency receiver.

3. The local positioning system of claim 1 wherein said plurality of acoustic receivers stops said selected timer upon receipt of an acoustic signal.

4. The local positioning system of claim 1 wherein said plurality of acoustic receivers stops said selected timer upon receipt of a leading edge of an acoustic signal.

5. The local positioning system of claim 1 further comprising a signal conditioning circuit in electrical communication with said plurality of acoustic receivers, said signal conditioning circuit amplifying and summing selected said acoustic output signals.

6. The local positioning system of claim 1 wherein said plurality of acoustic receivers are orthogonally configured.

7. The local positioning system of claim 1 wherein said plurality of acoustic receivers and said remote unit acoustic transmitter operate at ultrasonic frequencies.

8. The local positioning system of claim 1 wherein said plurality of acoustic receivers and said remote unit acoustic transmitter have a resonant frequency of approximately 25 kHz.

9. The local positioning system of claim 1 further comprising a control module acoustic transmitter centrally disposed within said control module housing, said control module acoustic transmitter being equidistant from each of said plurality of acoustic receivers, said control module acoustic transmitter in electrical communication with said processing device and said control module power supply.

10. The local positioning system of claim 1 wherein said control module acoustic transmitter operates at ultrasonic frequencies.

11. The local positioning system of claim 1 wherein said control module acoustic transmitter has a resonant frequency of approximately 25 kHz.

12. The local positioning system of claim 1 further comprising a transmitter pod having a plurality of acoustic transmitters configured to broadcast an acoustic signal in a circular pattern, said transmitter pod configured to be placed in electrical communication with said roving unit processing device and said roving unit power supply via an elongated, flexible member.

13. The local positioning system of claim 1 further comprising a lockable leveling system for orienting a set of said plurality of acoustic receivers in a horizontal plane.

14. A method for locating a mobile transceiver unit, said method comprising the steps of:

(a) transmitting a first acoustic signal from a selected location;

(b) transmitting a radio frequency signal from the selected location simultaneously with said step of transmitting an remote acoustic signal;

(c) starting a plurality timers upon receipt of said radio frequency signal, each of said plurality of timers corresponding to a selected one of at least three acoustic receivers;

(d) stopping each of said plurality of timers upon receipt of said first acoustic signal by said corresponding acoustic receivers to obtain a first timer value;

(e) recording said first timer value from each of said plurality of timers;

(f) transmitting a second acoustic signal from a central location equidistant from each said at least three acoustic receivers;

(g) starting said plurality of timers simultaneously with said step of transmitting a second acoustic signal, each of said plurality of timers corresponding to a selected one of at least three acoustic receivers;

(h) stopping each of said plurality of timers upon receipt of said second acoustic signal by said corresponding acoustic receivers to obtain a second timer (i) recording said second timer value from each of said plurality of timers;

(j) calculating an instant speed of sound to replace said predetermined speed of sound;

(k) resolving each first said timer value into a distance value by multiplying each said timer value by a predetermined speed of sound; and (l) calculating a location of said receiver unit based upon said distance values.

15. A local positioning system comprising:

a first ultrasonic transmitter means for broadcasting an ultrasonic signal;

a radio frequency transmitter means for broadcasting a radio frequency signal simultaneously with said ultrasonic signal;

a plurality of ultrasonic receiver means for receiving said ultrasonic signal;

a second ultrasonic transmitter means centrally located between each of said plurality of ultrasonic receiver means, said second ultrasonic transmitter means for broadcasting a second ultrasonic signal;

a radio frequency receiver means for receiving said radio frequency signal;

at least one timer means for measuring each time between receipt of said radio frequency signal at said radio frequency receiver means and said ultrasonic signal at each of said plurality of ultrasonic receiver means;

a processor means for controlling said timer means; and a communication means for transferring each said time to a storage device.

16. A local positioning system comprising:

an ultrasonic transmitter means for broadcasting an ultrasonic signal;

a radio frequency transmitter means for broadcasting a radio frequency signal simultaneously with said ultrasonic signal;

a plurality of ultrasonic receiver means for receiving said ultrasonic signal;

a radio frequency receiver means for receiving said radio frequency signal;

at least one timer means for measuring each time between receipt of said radio frequency signal at said radio frequency receiver means and said ultrasonic signal at each of said plurality of ultrasonic receiver means;

a leveling means for orienting a set of said plurality of ultrasonic receiver means in a horizontal plane;

a processor means for controlling said timer means; and a communication means for transferring each said time to a storage device.

* * * * *